United States Patent
Kaempflein et al.

(10) Patent No.: US 8,824,023 B2
(45) Date of Patent: Sep. 2, 2014

(54) SCANNING METHOD FOR A LARGE-SIZE SCANNER SYSTEM USING A STITCHING PROCESS

(75) Inventors: Simon Kaempflein, Friedewald (DE); Burkhard Schoelpen, Siegen (DE)

(73) Assignee: Roth + Weber GmbH, Niederdreisbach (DE)

( * ) Notice: Subject to any disclaimer, the term of this patent is extended or adjusted under 35 U.S.C. 154(b) by 0 days.

(21) Appl. No.: 14/007,051

(22) PCT Filed: Apr. 19, 2012

(86) PCT No.: PCT/EP2012/001692
§ 371 (c)(1),
(2), (4) Date: Sep. 24, 2013

(87) PCT Pub. No.: WO2012/146358
PCT Pub. Date: Nov. 1, 2012

(65) Prior Publication Data
US 2014/0036323 A1 Feb. 6, 2014

(30) Foreign Application Priority Data
Apr. 23, 2011 (DE) .......................... 10 2011 018496

(51) Int. Cl.
H04N 1/04 (2006.01)
H04N 1/409 (2006.01)
H04N 1/193 (2006.01)
H04N 1/387 (2006.01)
H04N 1/19 (2006.01)

(52) U.S. Cl.
CPC ................ H04N 1/4092 (2013.01); H04N 1/04 (2013.01); H04N 1/1933 (2013.01); H04N 1/3876 (2013.01); H04N 1/1903 (2013.01)
USPC ............................ 358/474; 358/450; 358/482

(58) Field of Classification Search
CPC ........... H04N 5/33; H04N 7/18; H04N 7/181; H04N 1/00005; H04N 1/00015; H04N 1/00408; H04N 1/0044; H04N 1/04; H04N 1/107; H04N 1/3876; H04N 2201/04703; H04N 5/232; H04N 5/23238; H04N 5/3658

USPC ......... 358/474, 482, 483, 449, 497, 513, 514, 358/450, 448, 488
See application file for complete search history.

(56) References Cited

U.S. PATENT DOCUMENTS 4,149,091 A * 4/1979 Crean et al. .................... 250/566
4,631,598 A * 12/1986 Burkhardt et al. ............. 358/425
(Continued)

FOREIGN PATENT DOCUMENTS

JP 2006067031 B 3/2006

*Primary Examiner* — Negussie Worku
(74) *Attorney, Agent, or Firm* — Andrew Wilford

(57) ABSTRACT

The invention relates to a scanning method for a large-size scanner system (1) comprising at least two image detection elements (2) that are used for scanning a large-size original (4) to be scanned and are arranged in a cascaded manner so as to have at least one overlapping area (13, 14). Said method, in which the image data in the at least one overlapping area (13, 14) of the image detection elements (2) is combined using a stitching process, said at least one overlapping area (13, 14) being searched for image data within a search region (10), includes the following steps: recognizing (18) the texture within the defined search region (10) of the original (4) to be scanned; assessing the data density in the recognized texture to determine a measure (19) of the texture content; weighting (22) the data density as a function of the measure (19) of the texture content of the recognized texture; detecting (20) congruent image elements within the defined search region (10) of the original (4) to be scanned; for each measured point (16 to 17), determining (24 to 25) a weighted deviation from the weighting (22) derived from the texture and the determined deviation (24 to 25) of each measurement; determining (27, 28) a weighted average of the deviations (29 to 30) from said weighted deviations (24 to 25); and calculating, from said weighted average (27, 28) of the deviation, shift values (29, 30) for correcting the position of the offset image elements such that said image elements are made to be congruent.

9 Claims, 3 Drawing Sheets

(56) References Cited

U.S. PATENT DOCUMENTS

| | | | |
|---|---|---|---|
| 4,774,592 A * | 9/1988 | Suzuki et al. | 358/451 |
| 4,972,273 A * | 11/1990 | Burkhardt et al. | 358/443 |
| 5,144,448 A * | 9/1992 | Hornbaker et al. | 348/324 |
| 5,440,130 A * | 8/1995 | Cox et al. | 250/370.09 |
| 5,532,845 A * | 7/1996 | Gusmano | 358/474 |
| 5,815,418 A * | 9/1998 | Dolazza et al. | 702/86 |
| 6,181,441 B1 * | 1/2001 | Walsh | 358/474 |
| 6,303,921 B1 * | 10/2001 | Hastings et al. | 250/208.1 |
| 6,348,981 B1 | 2/2002 | Walsh | |
| 7,440,145 B2 | 10/2008 | Kuwabara | |
| 8,487,995 B2 * | 7/2013 | Vanman et al. | 348/143 |
| 2003/0138167 A1 | 7/2003 | Rasmusen | |
| 2011/0310443 A1 | 12/2011 | Frisch | |

\* cited by examiner

SCANNING METHOD FOR A LARGE-SIZE SCANNER SYSTEM USING A STITCHING PROCESS

CROSS REFERENCE TO RELATED APPLICATIONS

This application is the US-national stage of PCT application PCT/EP2012/001692 filed 19 Apr. 2012 and claiming the priority of German patent application 102011018496.1 itself filed 23 Apr. 2011.

The invention relates to a scanning method for a large-format scanner having at least two image sensors that are used for scanning a large-format original and are cascaded so as to have at least one overlap region (13, 14) in which the image information of the image sensors is combined by a stitching process, the at least one overlap region within a search area being searched for image information.

DE 10 2009 011 945 [US 2011/0310443] discloses large-format scanner systems in which scanning devices cover the entire scanning width with continuous image sensors, for example, contact image sensors (CIS).

In addition, scanning devices including cascaded image sensors (for example CISs) in large-format scanner systems have been disclosed. The CIS used here is available from large production runs for small-format scanner systems used in the office, and thus provides a cost advantage over a CIS that is only produced in small production runs and cover the entire scanning width.

The cascaded arrangement, also known as a zig-zag orientation, is necessary in order to achieve a continuous scan image across the entire scanning width. The offset or overlap of the individual CISs is corrected for the x and y axes, for example by appropriate software methods, for example so-called stitching methods, so as to obtain a continuous scanning image.

U.S. Pat. No. 6,348,981 discloses an approach where the offset or overlap of the individual image sensors in the x and y axes is compensated for by static correction values. These static correction values have the disadvantage that corrections cannot be done in a continuously precise manner in the transition regions between the image sensors in the x and y axes. Small waves or breaks in the original being scanned or small variations in the throughput speed of the original being scanned produce visible image errors in the transition regions of the image sensors that are rendered as interrupted or offset lines, double lines, etc.

US 2003/0138167 or EP 1 422 924 [U.S. Pat. No. 7,440,145] also disclose methods in which a continuous blending between image sensors is achieved in the transition regions between image sensors by appropriate algorithms for average values of contiguous image sensors. Any image errors in the transition regions between image sensors are blurred in the x and y axes, and visually suppressed to a limited extent.

These methods produce a usable result only on first inspection, in particular, in the case of original containing linear information.

Adaptive stitching processes are known that eliminate the disadvantages of stitching processes using static correction values.

In addition to the stitching process using static correction values, these methods involve, for example, loading in appropriate memories identical image contents that have been scanned in the transition regions by two adjacent image sensors, and comparing these with each other.

Appropriate methods enable congruent image elements to be automatically recognized, and, when an offset is found in the x or y axes, correction algorithms are used to make them congruent.

The disadvantages of this method are as follows:

The stitching result is dependent to a high degree on the amount of image information that can be compared. The less image information there is on the original being scanned in the transition region of the image sensors, the worse the stitching result. When there is small amount of image information, what happens is that non-congruent image contents are incorrectly recognized as such, and this generally results in an incorrect association of supposed matches. This results in the x or y offset being magnified.

Variations in the speed of transporting the original being scanned below the cascaded image sensors often produce uncontrollable, nonlinear information shifts in the transition regions of the scanned image contents. The existing method does not allow these image shifts to be compensated for since the matches between overlapping image information data are too far apart to be made congruent due to the variations in speed. A known approach in such situations is to increase the search area. The disadvantage here is that the larger volume of data to be examined results in degradations in performance that can slow down the scanning process or bring it to a stop. In addition, an enlarged search area generally produces image errors, since image elements lying far apart that are only seemingly congruent are made to match, and this magnifies the visible offsets in the x and y axes.

The above-referenced speed variations occur at the beginning of the scan. The reason for this is that undriven, spring-mounted reflector rollers are generally used with cascaded image sensors, the function of these rollers being to press the original in a defined way against the glass plate that is below the image sensor. Due to the small focus range of known image sensors, this is necessary in order to generate a sharply focused scanned image. These undriven reflector rollers need to be accelerated and driven by the original being scanned, and this necessarily results in these speed variations at the leading end of the original being scanned. Another aggravating factor, in particular, is the fact that no image information is generally contained at the leading end of the original. This is true because standard-defined drawing sheet sizes, for example, as a rule specify a circumferential unprinted margin of 5 mm. The speed variations and the lack of image information, in particular at the leading end of the original, together result in a further degradation of the stitching result.

The object of the invention, which relates to a scanning method for a large-format scanner system having multiple image sensors where image information is combined using a stitching process, is to improve the stitching result in the overlap regions, avoid image errors, and accelerate the stitching process.

The object is achieved according to the invention for a method of the above-described type by the features provided in claim 1. Advantageous embodiments are provided in the dependent claims.

This object is achieved according to the invention by the following steps:

[S1] recognizing the texture within the defined search region of the original being scanned;

[S2] evaluating the information density in the recognized texture to determine a criterion for the texture content;

[S3] weighting the information density as a function of the criterion for the texture content of the recognized texture;

[S4] detecting congruent image elements within the defined search region of the original being scanned;

[S5] determining a weighted deviation for each measurement point from the weighting derived from the texture and the obtained deviation for each measurement,

[S6] determining a weighted average of the deviations from these weighted deviations; and

[S7] using this weighted average to calculate the deviation of shift values in order to correct the position of the offset image elements so that these image elements can be made congruent.

This scanning method according to the invention for a large-format scanner system in which an adaptive stitching process and dynamic correction algorithms are used enables the result of the stitching process to be improved in the overlap regions, errors in image rendering to be avoided, and implementation of the stitching process to be accelerated.

In an advantageous approach, the size of the defined search region of step S1 can be modified, in particular, enlarged when starting to scan the original being scanned.

According to the invention, detection of congruent image elements in step S4 can be done by measuring calculated deviations in the x and y axes.

It has been found advantageous if the detection of congruent image elements within the defined search region in step S4 is done at predetermined intervals in addition to the texture recognition.

According to the invention, the following steps can be performed prior to step S1 when starting to scan the original being scanned:
- defining a larger search region to detect the leading end of the original being scanned; and
- determining a texture value within the search region and weighting the recognized texture.

In an advantageous approach, the following additional steps can be implemented:
- determining fine regular information structures of supposedly congruent image information that cannot be uniquely assigned;
- comparing the supposedly congruent image information that has been determined in the search area with static stitching parameters that result from the x and y offset of the image sensors relative to each other;
- weighting the supposedly congruent image information based on the match with the static stitching parameters; and
- detecting image information with the highest weighting as being congruent image information.

According to the invention, any x and/or y offsets present are compensated by the correction algorithms.

It has been found advantageous if the weighting of the information density of the deviations and the selection of the maximum according to step S3 are calculated using static stitching parameters.

In an advantageous approach, determining a weighted average of the deviations in step S6 can be done by filtering and/or averaging while utilizing each weighting of the weighted deviations for each of the measurement points.

The following discussion describes the invention in more detail based on the illustrated embodiments that are illustrated in the drawing. Here:

Figure 1:
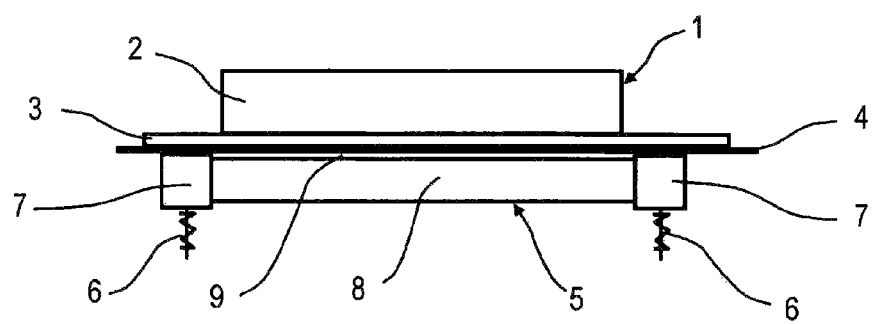
FIG. 1 shows a scanner system having image sensors and a reflector roller.

FIG. 1 shows a scanner system 1 having image sensors 2 in front of which is a glass plate 3. An original 4 being scanned is pressed against this glass plate 3 by a reflector roller 5 by springs 6. The springs 6 here apply force to lateral ends 7 of the reflector roller and thereby press the reflector roller against the original 4. The ends 7 of the reflector roller are of larger diameter than a center region 8 of the reflector roller. As a result, the reflector roller and the glass plate 3 form at the center region a gap 9 that is of a predefined dimension ensuring optimal contact of the original 4 being scanned with the glass plate 3. In addition, the gap 9 ensures there is sufficient space for the original 4 being scanned at the center region 8 of the reflector roller.

Figure 2:
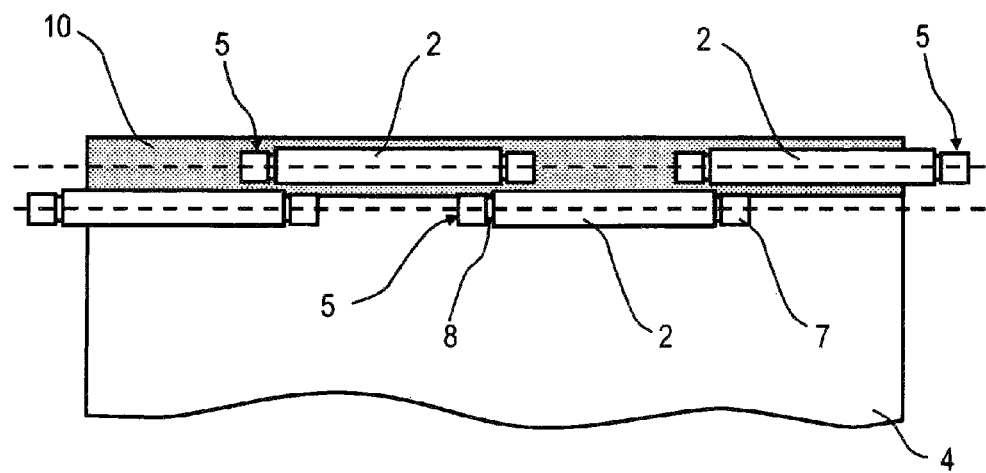
FIG. 2 shows a scanner system having cascaded image sensors.

FIG. 2 is a top view of a scanner system 1 having four image sensors 2 for scanning a large-format original, the image sensors being in a cascaded or zig-zag arrangement. An undriven reflector roller is associated with each image sensor 2, so that the center region 8 of the reflector roller is of a reduced diameter relative to the ends 7. The original 4 has a search area 10 in which a stitching process is used to search for image information in order to eliminate any uncontrollable, nonlinear information shifts that are created below the cascaded image sensors 2 due to speed variations when the original 4 is being transported.

The output signals from image sensors 2 are supplied by the known approach to a processing circuit that combines them. The scanning method according to the invention uses an adaptive stitching process that includes dynamic correction algorithms and is described below with reference to FIG. 3.

Figure 3:
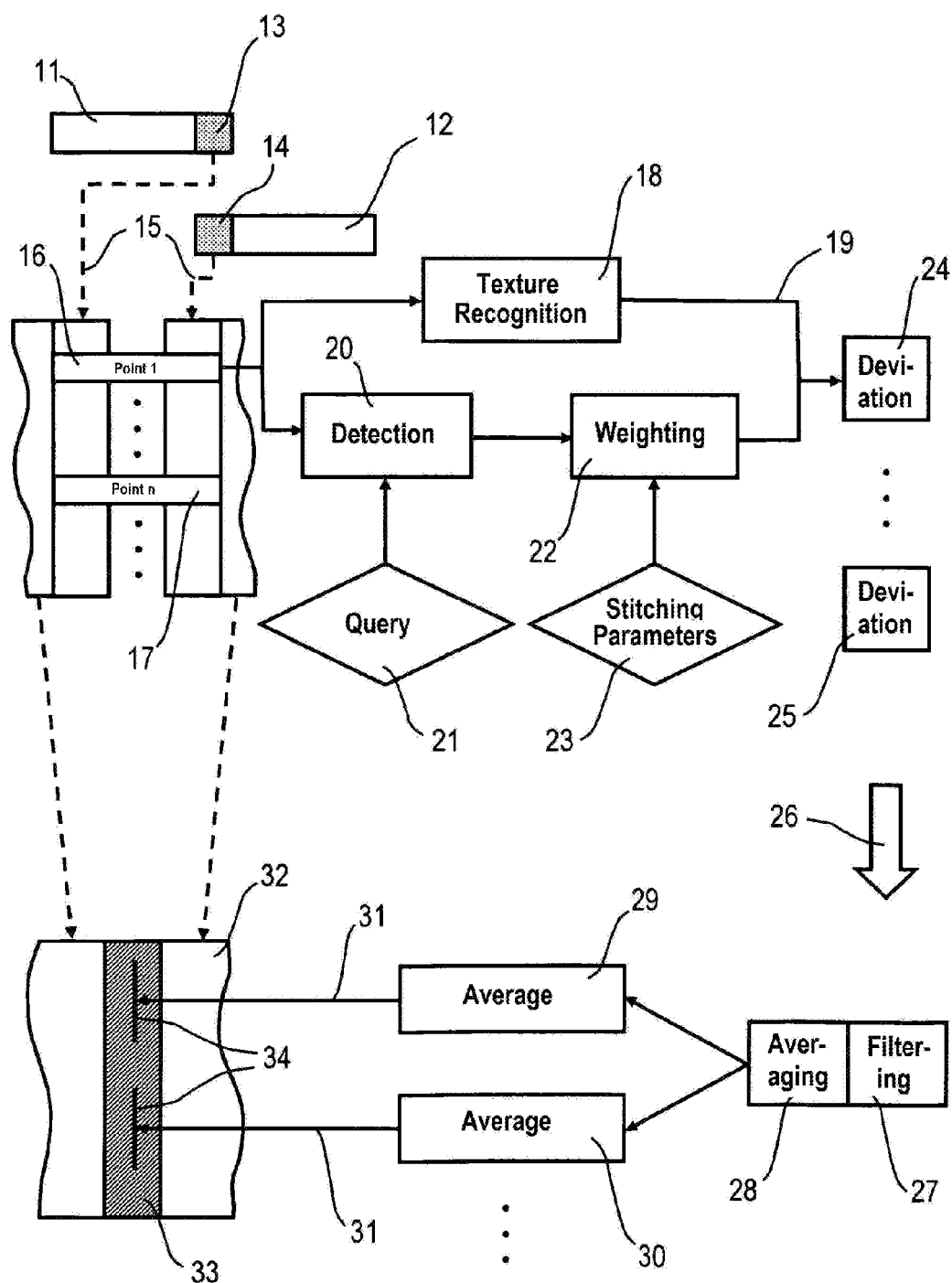
FIG. 3 is a flow chart of the process sequence according to the invention.

The following discussion refers to FIG. 3 to explain the details of the process sequence according to the invention, in which a large-format scanner system 1 is shown, by way of example, that includes two sensors 11 and 12 with overlap regions. The first sensor 11 has a first overlap region 13, while the second sensor 12 has a second overlap region 14. For purposes of better illustration, these overlap regions are shown again in enlarged form below the sensors 11 and 12, as indicated by dashed-line arrows 15. The sensors 11 and 12 include multiple measurement points in these overlapping image regions, among which are a first measurement point 16 and an nth measurement point 17. Texture recognition 18 is implemented based on the values determined in the overlapping image regions, and this texture recognition supplies a criterion 19 for the texture content of the measured regions. Detection 20 of congruent image information is done simultaneously. Whenever the leading end of the original 4 being scanned is detected by a query 21, the search area is enlarged as necessary. Based on the values determined by detection 20, a weighting 22 is calculated for the deviations and selection of the maximum using static stitching parameters 23. A weighted deviation 24-25 is then generated for each 1-n measurement points 16 to 17 based on criterion 19 for the texture content and weighting 22.

As arrow 26 indicates, averages 29-30 of the deviations are obtained therefrom by filtering 27 and averaging 28, while also utilizing the respective weightings of the weighted deviations 24-25, for the region of averages 29-30 of the deviations weighted with n measurement points.

Shifting 31 in the x and/or y axes of the pixels as a function of the obtained shift values enables one to obtain a stitched output image 32 including a blending region 33 in which the conjugate pixels of overlap regions 13 and 14 are made congruent. Original overlap regions 13 and 14 of the original 4 being scanned are combined at intersecting lines 34.

Figure 4:
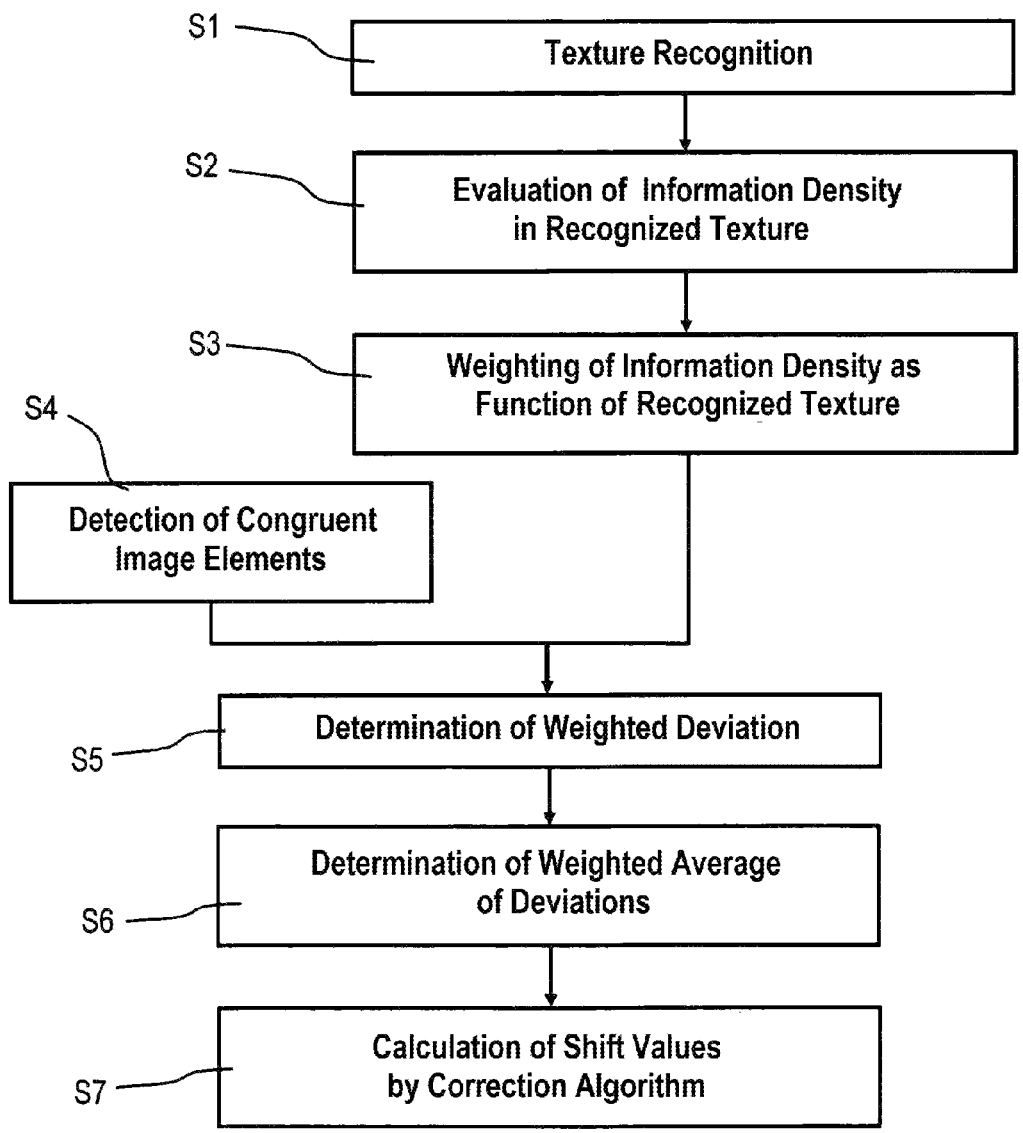
FIG. 4 shows the process steps for the large-format scanner system that are essential to the invention.

FIG. 4 once again summarizes the steps, essential to the invention, for the scanning method according to the invention for large-format scanner system 1, having image sensors 2 that are used for scanning a large-format original 4 being scanned and are cascaded so as to have overlap regions 13, 14, the image information in the overlap regions 13, 14 of the image sensors 2 being combined by a stitching process, and the at least one overlap region 13, 14 within the search area 10 is searched for image information.

A first process step S1 carries out texture recognition 18 within the defined search area 10 of the original 4 being scanned. A second process step S2 evaluates the information density in the recognized texture in order to determine criterion 19 for the texture content. Based on this, third process step S3 produces weighting 22 of the information density as a function of criterion 19 for the texture content of the recognized texture.

At the same time, process step S4 implements detection 20 of congruent image elements within defined search area 10 of the original 4 being scanned. Process step S5 uses these values to make a determination 24-25 of a weighted deviation of each measurement point 16-17 based on weighting 22 derived from the texture and calculated deviation 24-25 of each measurement. Process step S6 uses these weighted deviations to effect determination 27 and 28 of weighted average 29-30 of the deviations for each pixel.

In process step S7, this weighted average 29 and 30 of the deviations results in a calculation of shift values in order to correct the position of the offset image elements, thereby allowing the image elements to be made congruent.

The following summation describes the advantages of the method according to the invention over the prior art.

In order to improve the stitching result in the event of little or missing image information and speed variations when the original 4 is transported, the overlap regions 13 and 14 of the image sensors 2, or 11 and 12, are searched during the scanning operation for image information within a search area 10 of defined size. To this end, the method according to the invention essentially effects texture recognition 18 of the original 4 being scanned within the defined search area.

Search areas 10 that are of high information density yield a high texture value or criterion 19 for the texture content and receive a high weighting. Search areas 10 of low information density yield low texture value 19 and accordingly receive a low weighting.

It often occurs that originals 4 have homogeneous information areas, such as, for example, gray areas, in overlap regions 13 and 14 of image sensors 2. These areas are recognized as low texture value 19, then classified and assessed with a low weighting.

The method according to the invention uses at predetermined intervals within the defined search area 10 algorithms that, aside from texture recognition 18, use detection of congruent image information 20 to automatically recognize such congruent image information. The deviations determined along the x and y axes are thus obtained.

It has been found disadvantageous in previous methods to make the recognized offset in the x and y axes congruent after each measurement. The congruence has been achieved by adding or removing lines in the x and/or y axes by the width of a pixel. This type of procedure after each measurement results in frequent and unnecessary compensation of the offset and a magnification of the image errors.

The method according to the invention determines a weighting for each measurement as a function of the recognized texture. In addition, the deviation of congruent image elements is determined with each measurement. The weighted deviations 24-25 are determined for the measurement point 16-17 based on the weighting derived from the respective textures and the obtained deviations of the measurements. A weighted average of deviation 29-30 is determined from this weighted deviation 24-25 for a number of measurements. Based on this weighted average of deviation 29-30, offset image elements are made congruent by the correction algorithms.

The successful effect of this method is a significant improvement in the stitching result.

Whenever a search area of high texture value 19 is followed by a homogeneous image region of low texture, what generally occurs with previous methods is that the applied correction algorithms take effect despite the fact that this is unnecessary.

The consequence here is magnified image errors in the form of offsets in the x and/or y axes. These image errors occur in amplified degree with the increasing length of the homogeneous image region that is of low texture.

In the method according to the invention, a low weighting is given for each instantaneous measurement in the homogeneous image regions with low texture, i.e. with a low criterion for texture content 19. A further factor is that generally hardly any deviations of congruent image elements can be detected in these regions.

No correction algorithm is applied due to the low weighting of the texture and the obtained deviation results for the congruent image elements. The result here is that the above-described image errors do not occur.

Whenever the homogeneous image region of low texture is followed by an image region of high texture, what occurs with known methods using adaptive stitching is that an increasing number of image errors appears in the form of offsets in the x and y axes that are only recognized and compensated later in the scanning process.

In the method according to the invention, the image region with high texture value 19 in the instantaneous measurement is recognized and given a high weighting. The deviation of congruent image elements in the instantaneous measurement is also determined. A weighted deviation 25 is determined for the instantaneous measurement based on the high weighting here derived from the texture and on the obtained deviation of the instantaneous measurement. This occurs for a number of preceding measurements. A weighted average 29-30 of the deviations is determined from this weighted deviation 25 of the instantaneous measurement and the number of weighted deviations 24 of the preceding measurements. Based on this weighted average 29-30 for the deviation, the offset image elements are made congruent by the correction algorithms.

Experience has shown that weighted deviation 25 of the instantaneous measurement is incorporated to a higher degree in the correction algorithm based on high texture density 19, with the result that an offset in x and y axes is compensated immediately by the correction algorithms. No increased offset occurs at the beginning of image regions with high texture.

As explained above, image errors in the form of an offset frequently occur at the leading end of the original 4 being scanned in x and/or y axes, these errors being found, in particular, in the area of the initial image information, for example, of a line running horizontally.

The principal cause of these image errors involves a lack of image information at the leading end of the original 4 being scanned, and speed variations as the original 4 being scanned is being transported, which errors cannot be recognized and compensated for by the known methods.

The method according to the invention recognizes the leading end of the original 4 being scanned at the leading edge of the original 4 being scanned so as to improve the stitching result. To accomplish this, an enlarged search area is defined automatically.

This enlarged search area can only be applied at the leading end of the original 4 being scanned since experience has shown that little image information appears here, and there is no danger that widely separated, only seemingly congruent image elements will be recognized and made congruent due to the large search area. The lack of image information furthermore means that there is no danger of performance problems.

The method according to the invention can utilize an enlarged database based on the larger search area, and this results in increased effectiveness in recognizing textures and image information. An additional factor is that the enlarged search area enables even relatively large offsets to be recognized between the image information.

First, the texture value 19 is determined in the search area and appropriately weighted. Experience has shown that there is little image information at the leading end of the original 4 being scanned. As a result, the instantaneous measurement yields a low texture with a low weighting.

Measurement is continued as described above according to the invention. For each measurement, the deviation of congruent image elements is determined after the recognition of texture and weighting.

A weighted deviation 24-25 is determined for each measurement based on the weighting derived from the texture and from the obtained deviation of each measurement. Based on this weighted deviation 24-25 from a number of measurements, a weighted average 29-30 of the deviations is obtained. Based on this weighted average 29-30 of the deviation, the offset image elements are made congruent by correction algorithms.

The result is that generally no correction algorithms are required in the regions of low texture, and consequently of low weighting. If, however, the region of low texture is followed by a region of high texture, for example, in the form of a line running horizontally, this is recognized by the instantaneous measurement and given a correspondingly high weighting.

Nevertheless, no magnified offset occurs here in image regions with high texture.

Image errors generally occur in known methods in the form of x and/or y offsets in fine information structures. The reason is that with known stitching methods a plurality of supposedly congruent image information data points are sometimes recognized as congruent image information in the search area 10 of the overlap regions 13 and 14 of the image sensors 2, or 11 and 12 due to the fine regular information structures. What generally occurs here is that the known correction algorithms cause this image information to be erroneously made congruent, and this results in magnified image errors in the form of x and/or y offsets.

In order to improve the stitching result for fine regular information structures, the method according to the invention uses an algorithm to recognize supposedly congruent image information that cannot be uniquely assigned.

A method is used to effect a comparison of the supposedly congruent image information found in the search area 10 with static stitching parameters 23 that result from the x and y offset relative to each other of the image sensors 2, or 11 and 12.

The greater the match that is found between supposedly congruent image information with static stitching parameters 23, the higher these are weighted.

The image information with the highest weighting is recognized as congruent image information. Any existing x and/or y offsets are compensated for by the correction algorithms.

| List of reference numerals |
|---|
| 1 scanner system |
| 2 image sensor |
| 3 glass plate |
| 4 original being scanned |
| 5 reflector roller |
| 6 springs |
| 7 lateral regions |
| 8 center region |
| 9 gap |
| 10 search area |
| 11 first sensor |
| 12 second sensor |
| 13 first overlap region |
| 14 second overlap region |
| 15 arrows |
| 16 first measurement point |
| 17 nth measurement point |
| 18 texture recognition |
| 19 criterion for texture content |
| 20 detection of congruent image information |
| 21 query for the leading end of the original being scanned |
| 22 weighting of the deviations and selection of the maximum |
| 23 static stitching parameters |
| 24 weighted deviation (measurement point 1) |
| 25 weighted deviation (measurement point n) |
| 26 arrow |
| 27 filtering |
| 28 averaging |
| 29 weighted average of deviations |
| 30 weighted average of deviations |
| 31 shift in the x and y axes |
| 32 stitched output image |
| 33 blending region |
| 34 intersection lines |
| S1-S8 process steps |

The invention claimed is:

1. A scanning method for a large-format scanner system, having at least two image sensors used for scanning a large-format original and cascaded so as to have at least one overlap region, the image information in the at least one overlap region of the image sensors being combined by a stitching process, the at least one overlap region within a search area being searched for image information, the method comprising the following steps:

S1) recognizing the texture within the defined search region of the original being scanned;
S2) evaluating the information density in the recognized texture to determine a criterion for the texture content;
S3) weighting the information density as a function of the criterion for the texture content of the recognized texture;
S4) detecting a deviation in congruent image information within the defined search region of the original being scanned;
S5) determining a weighted deviation of each measurement point from the weighting derived from the texture and the detected deviation of each measurement, and
S6) determining a weighted average of the deviations from these weighted deviations; and S7 using this weighted average to calculate the deviation of shift values in order to correct the position of the offset image elements so that these image elements can be made congruent.

2. The scanning method according to claim 1, wherein the size of the defined search area in step S1 can be modified, in particular, enlarged when starting the scan of original being scanned.

3. The scanning method according to claim 1, wherein the detection of congruent image elements in step S4 is done by measuring the determined deviations in the x and y axes.

4. The scanning method according to claim 1, wherein the detection of congruent image information is done in step S4, in addition to texture recognition, at predetermined intervals within the defined search area.

5. The scanning method according to claim 1, wherein the following steps are performed prior to step S1 when starting to scan the original being scanned:
- defining a larger search region to detect the leading end of the original being scanned; and
- determining a texture value within the search region and weighting the recognized texture.

6. The scanning method according to claim 1, wherein the following additional steps are performed:
- determining fine regular information structures of supposedly congruent image information that cannot be uniquely assigned;
- comparing the supposedly congruent image information that has been determined in the search area with static stitching parameters that result from the x and y offset of the image sensors relative to each other;
- weighting the supposedly congruent image information based on the match with the static stitching parameters; and
- detecting image information with the highest weighting as being congruent image information.

7. The scanning method according to claim 6, wherein existing x or y offsets are compensated by correction algorithms.

8. The scanning method according to claim 1, wherein the weighting of the information density for the deviations and selection of the maximum in step S3 are calculated using static stitching parameters.

9. The scanning method according to claim 1, wherein the determination of a weighted average of the deviations in step S6 is done by filtering or averaging while utilizing each weighting of the weighted deviations.

* * * * *